United States Patent [19]

Specktor

[11] Patent Number: 4,736,964
[45] Date of Patent: Apr. 12, 1988

[54] LOCKING CAM FOR ADJUSTMENT OF AUTOMOBILE WHEEL ALIGNMENT

[76] Inventor: Gerald A. Specktor, 409 S. Cleveland Ave., St. Paul, Minn. 55105

[21] Appl. No.: 946,981

[22] Filed: Dec. 29, 1986

[51] Int. Cl.⁴ .............................................. B62D 17/00
[52] U.S. Cl. .................................................... 280/661
[58] Field of Search ............... 280/688, 701, 668, 663, 280/664, 665, 661, 96.1, 660

[56] References Cited

U.S. PATENT DOCUMENTS

| | | | |
|---|---|---|---|
| 751,202 | 2/1904 | Porter | 30/193 |
| 1,044,055 | 11/1912 | Johnson et al. | 403/107 |
| 1,279,686 | 9/1918 | Hale | 411/163 |
| 2,063,704 | 12/1936 | Slack | 280/124 |
| 2,162,828 | 6/1939 | Slack | 280/96.2 |
| 2,674,465 | 4/1954 | Carpezzi | 280/96.2 |
| 2,772,596 | 12/1956 | Trussell | 85/50 |
| 2,846,250 | 8/1958 | Davis | 287/58 |
| 2,859,058 | 11/1958 | Traugott | 287/53 |
| 2,934,684 | 4/1960 | Fegan | 317/234 |
| 2,962,317 | 11/1960 | Morse | 292/251 |
| 2,978,253 | 4/1961 | Weiss et al. | 280/96.2 |
| 3,033,588 | 5/1962 | Muller et al. | 280/96.2 |
| 3,124,370 | 3/1964 | Traugott | 280/96.2 |
| 3,163,441 | 12/1964 | Traugott | 280/96.2 |
| 3,880,444 | 4/1975 | Bridges | 280/661 |
| 4,595,216 | 6/1986 | Ware | 280/661 |
| 4,616,845 | 10/1986 | Pettibone | 280/661 |

*Primary Examiner*—Richard A. Bertsch
*Attorney, Agent, or Firm*—Kinney & Lange

[57] ABSTRACT

An apparatus for guarding against accidental displacement of two members of an automotive vehicle, after an adjustment of an alignment characteristic has been made, involving the use of cams which are used to adjust the alignment characteristic and which have prongs which are pressed into the adjacent surfaces of a member of the suspension system. The prongs are of case hardened steel so as to be capable of penetrating the adjacent material and thus prevent shifting of the position of the cam after tightening has been accomplished. The cams may be non-rotatably secured to a bolt with which they are associated so that the cams are adjusted by turning of the bolt. Or, they can be provided with slots or other openings which are placed over the bolt, the cams being adjusted after being placed over the bolt. In one form, a plurality of sets of cams are employed, each set having the opening for the bolt displaced from other sets of cams so that by selecting a cam having an opening displaced the proper amount, the bolt can be shifted in position to obtain the desired adjustment of the alignment characteristic.

19 Claims, 5 Drawing Sheets

LOCKING CAM FOR ADJUSTMENT OF AUTOMOBILE WHEEL ALIGNMENT

BACKGROUND OF THE INVENTION

1. Field of the Invention.

The present invention relates to an apparatus for adjusting at least one alignment characteristic in a suspension system for an automotive vehicle in which there are cams which are used for adjusting the alignment characteristics, the cams being provided with means for locking the cams in position after being adjusted.

2. Description of the Prior Art.

It is old to use cams for adjusting the relative positions of two members, one of which is secured to the wheel and the other of which is secured to the frame of the car, the cams being initially adjusted in position and then being drawn tightly against engaging surfaces by a bolt on which the cams are supported. The difficulty with this arrangement is that while the adjustment is maintained under normal conditions, a sudden impact such as the automotive vehicle hitting a "pot hole" will cause the adjustment to shift.

Various arrangements have been proposed for preventing the alignment characteristics from being shifted after an adjustment has been made. For example, the Trussel U.S. Pat. No. 2,772,596 shows an arrangement employing a shim 30 which has serrations on it so that the shim when driven in does not tend to move.

The Slack U.S. Pat. No. 2,063,704 shows an arrangement in which there is a key that is inserted in the threads after adjustment has been made.

The Slack U.S. Pat. No. 2,162,828 shows two members having cooperating serrated surfaces which tend to register together to prevent the adjustment of the alignment from being disturbed.

The Ware U.S. Pat. No. 4,595,216 likewise shows an arrangement in which there are cooperating serrations which are locked together after the adjustment has been made in the alignment.

The Traugott U.S. Pat. No. 3,163,441 shows an arrangement in which there is a lock washer having a plurality of serrations on the opposite sides thereof so as to bite into or grip the adjacent shoulder and adjustable bushing. This is designed to prevent a shift in the alignment characteristics. In the Traugott U.S. Pat. No. 3,124,370, a ring with serrated edges is used for the same purpose.

There are a number of other patents in the alignment field which have means for limiting the amount of displacement that can occur after the adjustment has been made and tightened. None of these, however, are concerned with the use of alignment adjustment cams which present a unique problem. The use of alignment adjusting cams present a unique problem in that the distance from the center of the cam support to the periphery varies continuously so that as the cam is rotated, the pattern of engagement with an adjacent surface continuously changes. Furthermore, the increment of adjustment may be relatively small so that it is undesirable to have any arrangement which restricts the amount of adjustment by reason of meshing serrations, for example. Moreover, it is very desirable to be able to have considerable flexibility with regard to the equipment used to insure the locking of the cams in the adjusted position.

SUMMARY OF THE INVENTION

The present invention is concerned with an arrangement for adjusting at least one alignment characteristic in a suspension system for an automotive vehicle in which there is a bolt for drawing together two members, the relative position of which affects the alignment of the vehicle, and in which the cams are disposed on this bolt and are provided with inwardly facing spaced prongs which, upon tightening of the cams against the surfaces engaged by them, tend to penetrate the surfaces to prevent subsequent shifting of the cam.

By using substantially spaced prongs, there is very little likelihood that adjustment will be hindered by reason of the prongs engaging recesses made as a result of a prior adjustment of the alignment. By providing the cams with inwardly facing prongs, as contemplated by my invention, it is possible to employ a number of different cam arrangements. It is already old to have a bolt with one cam near the head of the bolt secured thereto, the bolt having a flat side and providing a second cam with an opening corresponding to the cross sectional area of the slotted portion, this cam being placed over the end of the bolt and drawn tightly against the surfaces the cams engage. In this type of arrangement, using the present invention, the prongs are forced into the adjacent surfaces engaged by the cams to prevent the cams turning. In the arrangement of the present invention, it is possible to employ cams with open slots which can be merely slipped over the bolt when the nut associated with the bolt is loose. When the nut is tightened, the cams are held against turning because of the prongs.

It is also possible, by providing cams having slots located in different positions, to adjust camber merely by selecting cams having the slots in the right positions and moving them over the bolts, thus displacing the position of the bolt in the slot through which it extends.

It is also possible to provide cams with open-ended slots in which, after the cam is inserted over the bolt, the angular position of the cam is adjusted without adjusting the position of the bolt. The adjusted angular position of the arm is held against turning because of the prongs. It thus becomes possible to use a bolt which does not have a flat surface, the cam being merely turned on the bolt to obtain the desired adjustment of the alignment characteristic in question. This makes it possible to use a standard replacement bolt where it is necessary or desirable to replace the bolt.

Various other features of the invention will be apparent from a consideration of the accompanying specification, claims and drawing.

DETAILED DESCRIPTION OF THE PREFERRED EMBODIMENTS

Figures 1, 3:
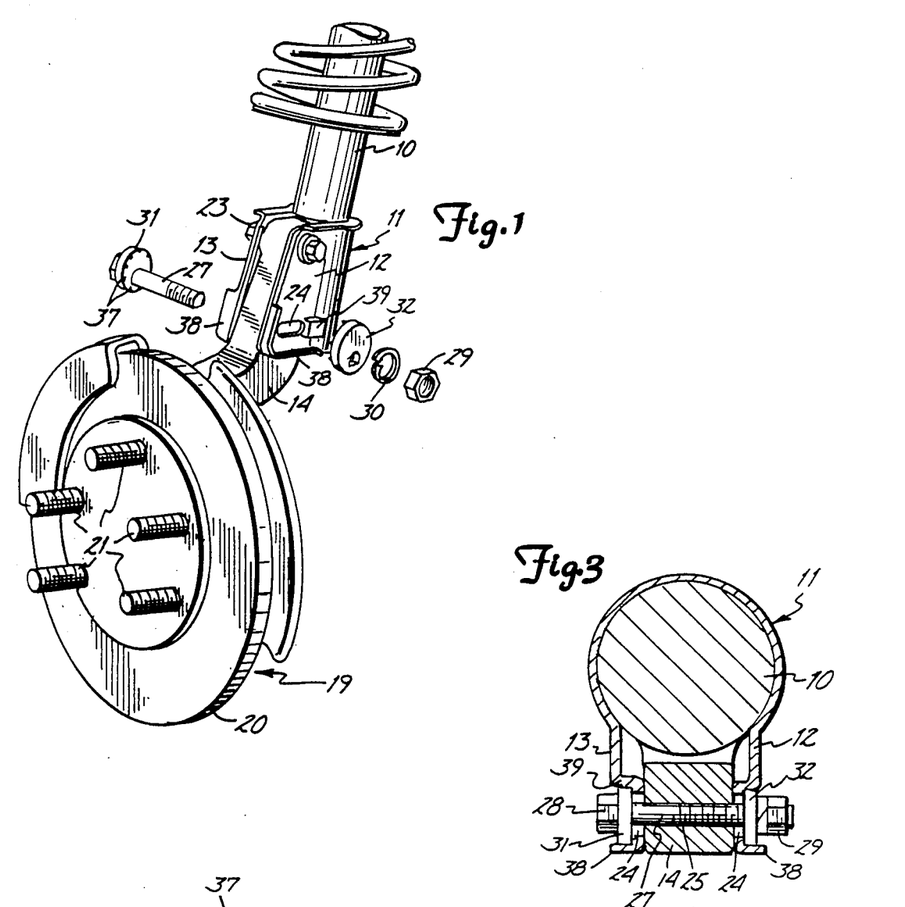
FIG. 1 is a perspective view of the invention in use in connection with adjusting camber where a "McPherson strut" is employed in connection with disk brakes, the bolt and cams being shown in an exploded view.
FIG. 3 is a sectional view taken along line 3—3 of FIG. 1.

Referring to FIG. 1, there is shown in perspective the invention applied to means for adjusting the relationship between a wheel and a piston rod 10 of a McPherson strut. The piston rod 10 forms part of a shock absorber which in turn is suitably connected to the vehicle frame. The rod 10 has secured thereto a bracket generally indicated as 11. This bracket has two flanges 12 and 13. Secured between the flanges 12 and 13, in a manner to be described, is an arm 14 which in turn is connected to a bearing and wheel support assembly 19. The assembly 19 is that of a typical wheel assembly having a disk brake. There is a rotating disk 20 and secured thereto are a series of projecting posts 21 to which the wheel is fastened.

A bolt 23 extends through two openings in the upper portions of flanges 12 and 13 and through a corresponding opening in the arm 14. Normally, the bolt is tightened. It is loosened when it is desired to change the alignment, as will be discussed.

Figure 2:
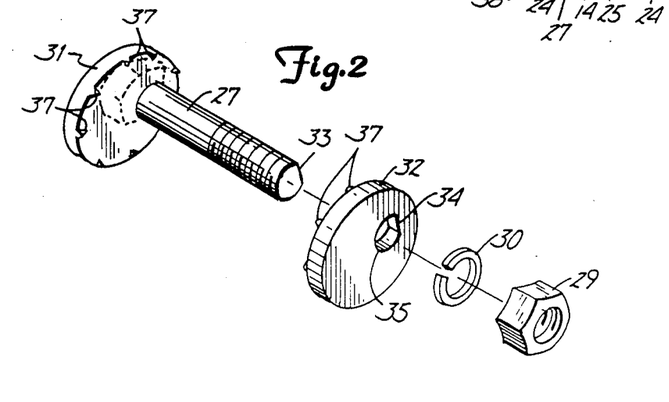
FIG. 2 is an exploded view on a larger scale of the the cams and the bolt on which they are disposed.

The flanges 12 and 13 are provided with a plurality of aligned slots 24, only one of which is visible in FIG. 1. Both are shown in section in FIG. 3. A hole 25 (shown in FIG. 3) extends through the arm 14 in alignment with the slots 24. Extending through the slots 24 and the hole 25 is a bolt 27 having a hexagonal bolt head 28 and a nut 29. A lock washer 30 bears against the nut 29 and guards against it loosening. Disposed on the bolt 27 are two cams 31 and 32. These cams have eccentric openings through which the bolt 27 extends. The bolt 27 is cut away to provide a flat face 33. Both of the cams 31 and 32 have openings which generally correspond in cross-sectional configuration to the cross-sectional configuration of the flattened portion of bolt 27. This is clearly shown in connection with cam 32 in which the opening 35 is shown as having a flat portion 34. A similar opening exists in cam 31. In the form of FIG. 2, the cam 31 tightly fits about the bolt 27 and is secured to the bolt so that it cannot readily be removed therefrom. In the case of cam 32, the opening 35 is slightly larger in cross section than the flattened portion of bolt 27 so that the cam can slide onto the bolt. The side flanges 12 and 13 are provided with cam engaging projections 38 and 39 providing cam bearing surfaces. It will be noted that the cam engaging projection 38 is curved so that it has an upstanding cam engaging projections as well as a bottom cam bearing surface. The cam bearing surface 39 projects outwardly and is designed to engage the opposite side of the cam from that engaged by the upstanding portion of the cam bearing surface 38. The spacing between the upstanding portion of cam bearing surface 38 and cam bearing surface 39 is substantially equal to the diameter of the cams 31 and 32 so that these cams are held against sidewise movement.

It will be readily apparent that any rotation of the bolt 27 will result in corresponding rotary movement of the cams 31 and 32. Since the cams are held against sidewise movement by the cam bearing surfaces 38 and 39, such rotation of the cams will result in sidewise movement of the bolt 27 within the slots 24. Since the bolt 27 extends through a hole 25 in the arm 14 and snugly fits within the hole 25, any movement of the bolts 27 will cause a shifting of arm 14. Since the arm 14 is secured to the wheel assembly 19, this will result in tilting of the wheel assembly and a change in the camber adjustment of the wheel.

The apparatus as described so far is basically old. The novel features of the present invention will now be described. In the first place, it should be pointed out that the flat portion 34 of hole 35 through the cams is in the outer portion of the hole 35 rather than the inner portion. This means that there is more material at the narrowest portion of the cam than would be the case if the flat portion 34 was on the opposite side of the hole 35 and the curved portion of the hole 35 extended through the narrow portion of the cam.

In the second place, and this is the important feature of the present invention, both cams are provided with a plurality of inwardly facing prongs 37. The prongs are spaced around the periphery of the cam with a substantial spacing between them. In the typical case, there are approximately eight prongs. The maximum inward projection of the prongs occurs at the periphery of the cam. From this point, they taper downwardly toward the base of the cam, as best shown with cam 31. The cams 31 and 32 are preferably made of steel which is case hardened so that the prongs 37 are extremely hard so as to be capable of penetrating the side walls 12 and 13 of flange 11.

In use, after the desired amount of camber correction has been determined, the nut 29 and the nut on bolt 23 are loosened. The hexagonal head 28 of bolt 27 is then turned to turn the cams 31 and 32, thus tilting the arm 14 with respect to the rod 10 until the desired camber has been attained. The nut on bolt 23 is then tightened and the nut 29 is tightened. The tightening of the nut 29 draws the two cams 31 and 32 together. As the nut 29 is tightened, the prongs 37 penetrate the side walls 12 and 13, thoroughly locking the cams 31 and 32 in their adjusted position.

Figure 4:
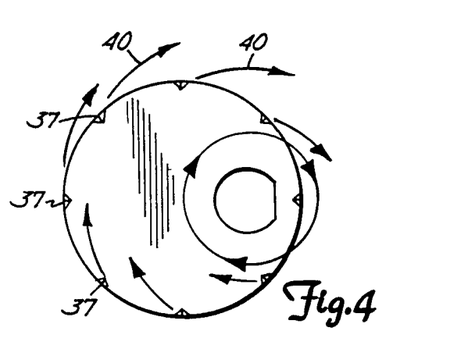
FIG. 4 is a diagrammatical view showing the way in which the position of the prongs changes as the cam is rotated.

Because of the substantial spacing between the prongs 37, it is unlikely that the depressions formed by the prongs 37 will affect a later adjustment. If the prongs 37 were adjacent each other and extended completely around the periphery of the cams, there would always be the possibility that if the cams had been adjusted once and then wore loose and were readjusted, the teeth would tend to slide into the openings made because of the previous adjustment. With the arrangement of the present invention, this is unlikely. It is to be borne in mind that the prongs do not follow a circular path when the cam is adjusted. This is shown in FIG. 4 in which the pattern of the prongs 37 is indicated schematically by a plurality of curved lines 40. It will be seen that as the cam is adjusted, the prongs 37 tend to move outwardly along an arcuate path. It will also be noted, as previously stated, that the prongs are along the periphery of the cam. This means that they are able to engage the portion of the surfaces of flanges 12 and 13 outside of the slots 24. If these prongs were spaced inwardly, some of them would tend to engage the surfaces 12 and 13 where there were slots 24. This would decrease the effectiveness of the prongs. Furthermore, by having the prongs adjacent the periphery of the cams, a greater torque is required to dislodge them. The result of the various features that have been discussed is that once the nut 29 is tightened, the adjustment that is made is very secure and there is no likelihood of the relative positions of the rod 10 and the arm 14 being changed as a result of the vehicle being subject to an impact of some kind such as going over a "pothole." It will be seen that the means which I have employed to prevent such turning is extremely simple to manufacture and requires relatively little alteration of existing equipment for adjusting camber and/or caster.

MODIFICATIONS OF FIGS. 5 THROUGH 8

Figure 5:
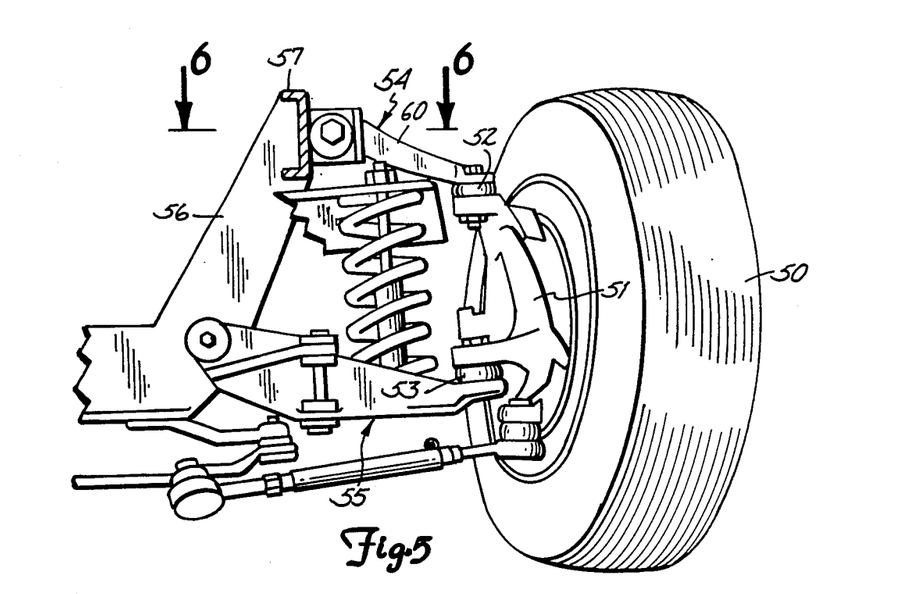
FIG. 5 is an elevational view of an "A-frame" construction employing cams of the present invention for adjusting camber and caster.
Figure 6:
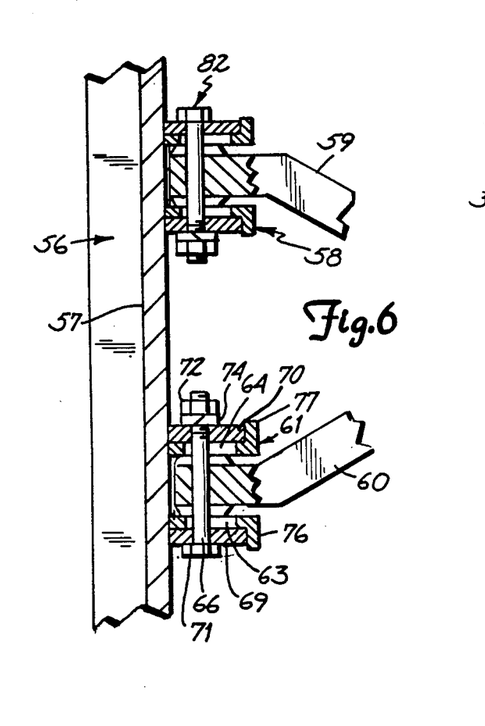
FIG. 6 is a detail sectional view, the section being taken along the line 6—6 of FIG. 5.

In FIGS. 5 through 8, the invention is applied to an A-frame type of arrangement for adjusting camber and/or toe. Referring to FIGS. 5 and 6, a typical wheel is indicated by the numeral 50. This is supported on a wheel axis support arm 51 which is in turn connected by articulated joints 52 and 53 with an upper U-shaped bracket 54 and a lower U-shaped bracket 55. Brackets 54 and 55 are pivotally secured to a frame member 56 which has at its upper end a channel member 57 integrally formed therewith.

The upper U-shaped bracket 54 has two arms 59 and 60, as shown in FIG. 6. These arms 59 and 60 are connected to the channel member 57 through brackets 58 and 61, respectively. Brackets 58 and 61 are basically identical, and bracket 61 and the manner in which arm 60 is connected thereto is shown in particular detail in FIGS. 7 and 8. Bracket 61, like bracket 58, is rigidly secured to the channel member 57 in any suitable manner, as by welding. Brackets 61 and 58 correspond in function to bracket 11 of the species of FIG. 1. In other words, like bracket 11 these brackets provide for rotation of the cam and the movement of a bolt in slots in the bracket.

Figure 7:
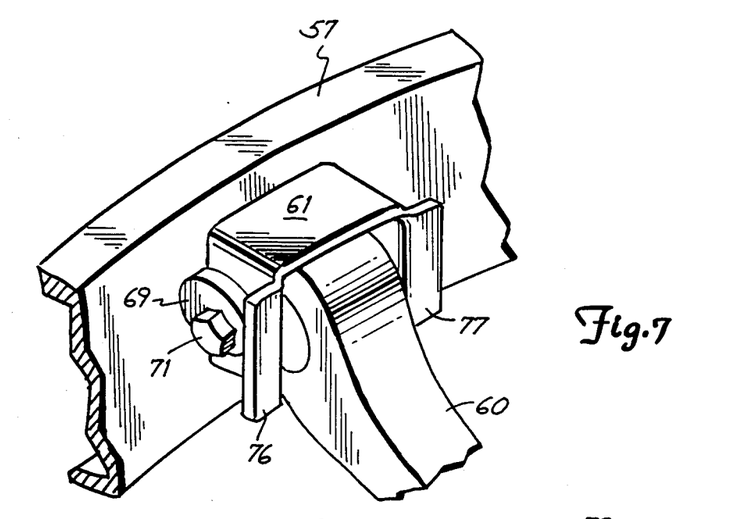
FIG. 7 is a perspective view of a portion of the mechanism shown in FIG. 5, the view being on a much larger scale than in FIG. 5.
Figure 8:
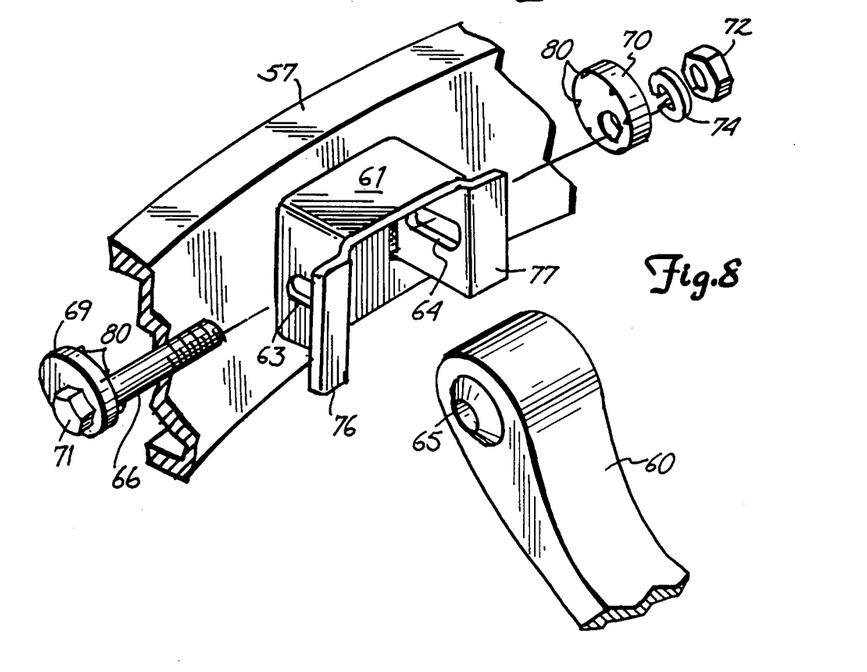
FIG. 8 is an exploded view of the same mechanism shown in FIG. 7.

Referring specifically to FIG. 8, it will be noticed that the bracket 61 has two side walls in which are disposed slots 63 and 64. The arm 60 has a bolt opening 65 therethrough so that when the arm 60 is disposed within the space between the two side walls of bracket 61, the opening 65 is in alignment with the slots 63 and 64. A bolt 66 is designed to extend through the slots 63 and 64, and the opening 65 of arm 60. As with the previously described form of the invention, the bolt 66 has two cams 69 and 70 non-rotatably secured thereto. The cam 69 may, for example, be permanently secured to bolt 66 whereas the cam 70 may be slidably but non-rotatably secured to bolt 66 in a manner similar to the way in which cam 32 of FIG. 2 is secured to bolt 27. For purposes of clarity, only a portion of bolt 66 is shown in FIG. 8. The entire bolt, however, is shown in FIG. 6. The bolt 66 has a conventional hexagonal head 71 secured thereto and cooperates with a hexagonal nut 72 which is threadedly engaged with the bolt 66. A lock washer 74 may be interposed between the nut 72 and the cam 70 so that when the nut is tightened, the nut is held against turning. The bracket 61 is provided with two side flanges 76 and 77 which extend generally parallel to the opposed surface of the channel member 57. The flanges 76 and 77 are spaced from the channel member by a distance equal to the diameter of the cams 69 and 70 so that the cams are held against longitudinal displacement with respect to the channel member 57 and the bracket 61. Thus, when the cams 69 and 70 are rotated (as by rotation of bolt 66), with the device in the assembled position shown in FIGS. 6 and 7, the bolt 66 will be shifted along the slots 63 and 64 to move the arm 60 with respect to the channel member 57. Once the adjustment has been made, the nut 72 is tightened to draw the cams 69 and 70 against the side walls of bracket 61.

Like the arrangement of FIGS. 1 through 3, the cams 69 and 70 are provided with prongs 80. The cams 69 and 70 and the prongs 80, are made of case hardened steel so that upon the nut 72 being tightened, the prongs 80 will be forced into the adjacent walls of the bracket 61. As with the modification of FIGS. 1 through 3, the prongs 80 are disposed along the periphery of the cams 69 and 70 and project the greatest distance away from the cam at the periphery of the cam. The advantages of such a location of the prongs 80 is similar to that discussed in connection with the prongs 37 of the species of FIGS. 1 through 3.

The arrangement of FIGS. 5 through 8 provides for adjustment of either the camber alone or camber and toe-in. The arrangement for adjusting the position of arm 59 with respect to the frame 56 has not been discussed in detail. It is, however, similar to that described in connection with arm 60. The cams have been given the reference numerals similar to that of the cams in connection with arm 60. The bolt, in the case of arm 59 and bracket 58, is designated by the reference numeral 82. As with the arrangement of arm 59 and bracket 58, the turning of the head of bolt 82 will turn the cams and cause the arm 59 to move outwardly or inwardly with respect to the channel shaped member 57 to which the bracket 58 is secured. If both bolts 66 and 82 are rotated by the same amount in the same direction to cause the arms 59 and 60 to move in the same direction and by the same amount with respect to the frame 56, an adjustment will be made of the camber of the wheel. It will be obvious that such an adjustment causes the arms 59 or 60 to swing outwardly or inwardly to cause a similar movement of wheel 50. If, however, the two sets of cams are adjusted differently or in opposite directions, this will result in a change in the toe-in. It will be obvious that if, for example, bolt 66 is rotated in one direction and bolt 82 in the other direction, the two arms 59 and 60 will move in opposite directions with respect to the channel member 57 causing a turning of the wheel 50 about the joints 52 and 53 to cause a change in the amount of toe-in.

Regardless of whether camber or toe-in is being adjusted, or whether both are being adjusted, it will be clear that with the arrangement of the present invention, the prongs 80 will be forced into the adjacent faces of the brackets 58 and 61 to maintain the adjustment despite any impact to which the wheel may be subjected. Because of the location of the prongs 80, the cams will be held firmly against any shifting in position.

Figure 9:
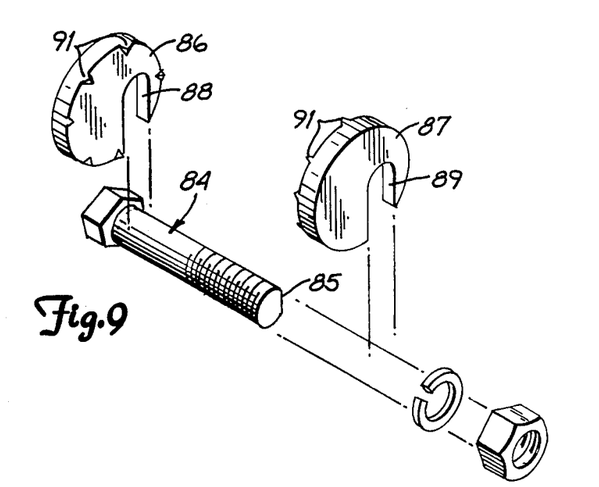
FIG. 9 is an exploded view showing the manner in which my improved cams can be used in connection with a bolt from which the previous cams have been removed.

MODIFICATION OF FIG. 9

In FIG. 9, there is shown an arrangement which makes it possible to provide for the use of my improved cams without completely disassembling the device to remove the bolt holding together the member secured to the frame and the member secured to the wheel. In this case, the bolt is designated by the numeral 84 and is similar to the bolt 27 of FIG. 2. It has the usual hexagonal head, lock washer and nut. It also has a flattened surface 85 corresponding to the flattened surface 33 of the bolt 27 of FIG. 2.

In this case, the cams are designated by the numerals 86 and 87. These cams have slots 88 and 89 designed to go over the bolt 84 because of the flattened section 85. In other words, the distance between the flat surface 85 and the opposed curved surface of the bolt is equal to the width of slots 88 and 89.

Both slots 88 and 89 are open ended slots so that the cams 86 and 87 may be slipped over the bolt 84. Normally, the vehicle comes equipped with an arrangement in which there is a cam corresponding to cam 31 of FIG. 2 which is permanently secured to the bolt. In order to use a cam similar to the cam 86, it is necessary to remove this cam. This can be done with a cold chisel or a similar device. Where it is impossible to remove the cam while the bolt is in position, the bolt can be withdrawn from the connection between the member secured to the wheel and the member secured to the frame. In many cases, however, all that is necessary to do is to loosen the nut on bolt 84 and cut out the cam adjacent the head of the bolt. The cam corresponding to cam 87 can be readily removed once the nut is removed, as is clear from FIG. 1. The two cams 86 and 87 can now be dropped in place. These cams have inwardly facing prongs 91 and, when the nut associated with bolt 84 is tightened, the prongs will press into the adjoining surfaces of the bracket through which the bolt extends.

Figures 10, 11:
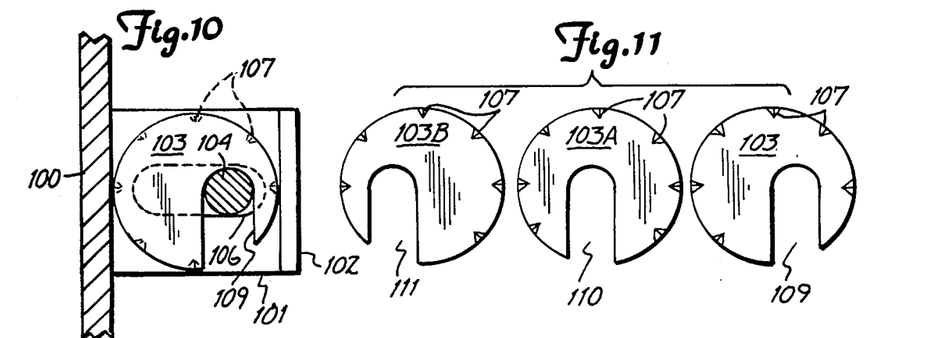
FIG. 10 is a fragmental view showing an arrangement in which cams with slots in different positions are employed to shift the position of the bolt in a slot without actually turning the cam.
FIG. 11 is a composite view showing three cams with the slots in different positions.
Figure 12:
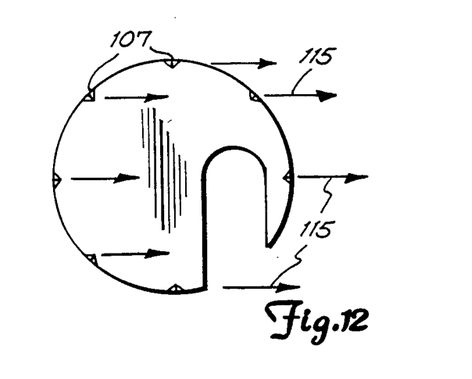
FIG. 12 is a view showing the manner in which points of contact with the adjacent surface are shifted as the cam is inserted to move the position of the bolt in the slot.

MODIFICATION OF FIGS. 10, 11 AND 12

In the previously described species, the cam member was rotated. It is possible, however, by providing a plurality of cams, each with a slot or other opening in a different position, to obtain the desired alignment adjustment by selecting a cam with a slot or opening in the correct position to locate the bolt in a position to give the desired alignment characteristic.

In FIG. 10, a bracket 101 is secured to a frame member 100, the bracket 101 corresponding to bracket 61 of FIGS. 7 and 8. The bracket 101 has a flange 102 and a cam 103 is disposed between the flange 102 and frame member 100, the cam 103 having a diameter equal to the transverse distance between flange 102 and frame 100. The cam 103 is shown as having a slot 109 which surrounds a bolt 104. The bolt 104 is held in a position with respect to a slot 106, which position is dependent upon the position of slot 109. On the left-hand side of FIG. 10, there is shown a dotted line position of the bolt 104 which occurs when the slot is at a different position on the cam 103.

In FIG. 11, there are shown three cams each with a slot in a different position. It is to be understood that in actual practice, there would be a larger number of such cams, each with a slot in a different position. It will be noted that in the case of cam 103, slot 109 is substantially to the right of a vertical center line. There is also a cam 103A which has a slot 110 which is somewhat to the left of a vertical center line. In the case of cam 103B, the slot 111 is still further to the left of the vertical center line. Again, it is to be emphasized that the cams 103, 103A and 103B are merely representative of a number of cams, any one of which can be selected to give the desired alignment adjustment. In use, the cam which will give the desired alignment adjustment is selected and then is placed in position between the flange 102 and the frame member 100. It is necessary, of course, to first loosen the nut on the end of the bolt 84, and the member carrying the bolt is then moved so that the selected cam will go over the bolt 84. Thereafter, the nut on the end of the bolt is tightened up.

As with the other species, the cams are provided with prongs 107 which engage the adjacent surface of the bracket when the nut is tightened up. The prongs, as with the other modifications, are made of case hardened steel so that they will penetrate the adjacent surface of the bracket. With this arrangement, it is possible to use round bolts and there is no problem of turning the cams to attain the desired position. The part secured to the wheel and the part secured to the frame are initially adjusted to the desired angle and the corresponding cam is then slipped over the bolt. After being tightened, the bolt is held in position.

FIG. 12 shows the path that the prongs would tend to take upon relative movement of the member secured to the wheel and the frame member. In this case, the lines of movement of the prongs would be horizontal and these lines are indicated by the numeral 115.

While the cams of FIGS. 10 and 11 are shown as having slots, it is to be understood that the cams could be provided with circular openings variably spaced from a vertical center line. Where such circular openings are employed, the bolt 104 has to be removed to receive the cams.

Figure 13:
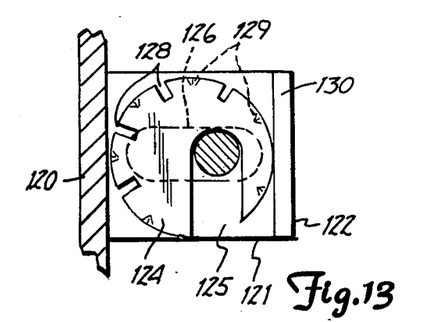
FIG. 13 is a fragmental view showing a cam which is rotated but in which there are slots for engagement by a tool to rotate the cam without rotation of the bolt.
Figure 14:
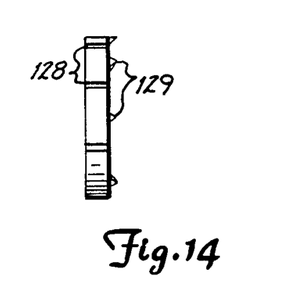
FIG. 14 is an elevational view of the cam of FIG. 13.

MODIFICATION OF FIGS. 13 AND 14

In FIGS. 13 and 14, there is shown a modification in which the cams are rotated but in which they are rotated independently of the angular position of the bolt.

Referring to FIG. 13, it will be noted that there is a frame member 120 to which is secured a bracket 121 having a flange 122 extending parallel to the frame 120. Cam 124 is disposed between the flange 122 and the frame member 120. The cam is provided with a slot 125 adapted to go over a bolt 126. In the present species, the cam 124 is provided with a plurality of peripheral notches 128 which are designed to receive a tool such as a screwdriver for turning the cam. In use, the nut on the end of bolt 16 is loosened so that the cam 124 can be turned. A screwdriver or other suitable tool is inserted into an accessible notch 128 and is used to manipulate the cam until the bolt 126 is in the desired position. It will be obvious from a consideration of FIG. 13 that any rotation of the cam will result in a shifting of the bolt in the slot 130 of the bracket 121.

The cam, as in the other species, is provided with a series of prongs. In this case the prongs are designated by the reference numeral 129. Again, after the cam has been adjusted to the position producing the desired alignment characteristic, the nut at the end of bolt 126 is tightened up to force the prongs 129 inwardly against the adjacent surfaces of the bracket.

One of the advantages of the arrangement of FIGS. 13 and 14 is that a conventional bolt can be used. It is not necessary to provide a flattened surface on the bolt, as with the modifications of FIGS. 1 through 9. It is also not necessary to turn the bolt. There are times when the position of the bolt head with respect to the rest of the apparatus makes turning of the bolt inconvenient.

Again, it will be seen that the adjustment obtained by rotation of the cam 124 will remain fixed, once the nut on the end of the bolt is tightened, due to the prongs 129 pressing into the adjacent bracket surface.

In connection with both the modification of FIGS. 10 through 12, and that of FIGS. 13 and 14, only one cam and one bracket have been shown. It is, of course, understood that there would normally be two cams. Where only one bracket is necessary, these cams would engage opposite faces of the bracket.

MODIFICATION OF FIGS. 15 THROUGH 19

In the modification of FIGS. 15 through 19, cams are provided, each with a boss which projects into an opening in the element engaged by it so as to prevent the cam being shifted laterally. In the arrangement of FIG. 1, it will be recalled that there were cam engaging portions 38 and 39 which restrained the movement of the cam laterally. In the arrangement of FIGS. 15 through 19, this restraint against lateral movement of the cam is provided by a boss which extends into an opening of the walls of the bracket member.

Figures 15, 19:
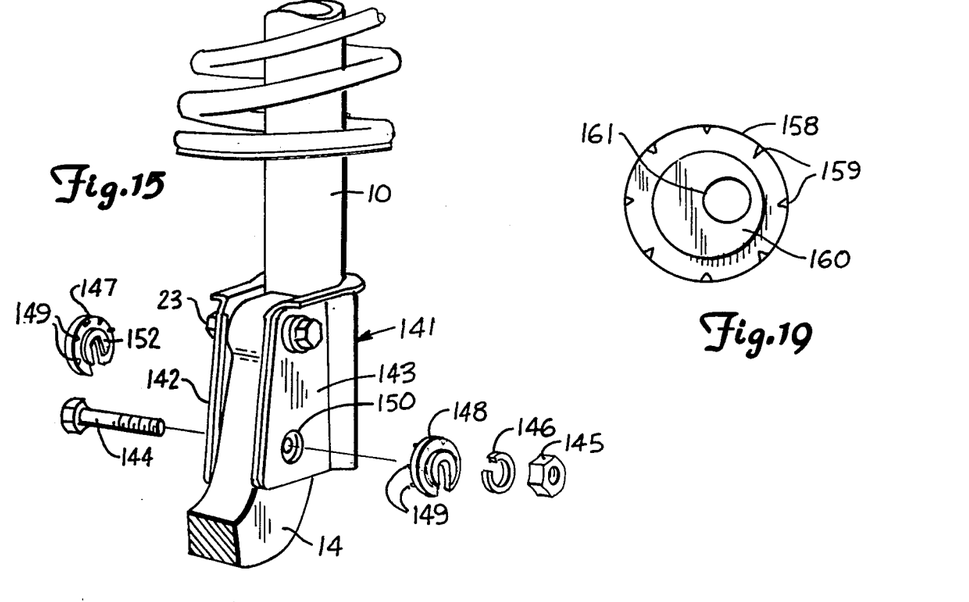
FIG. 15 is a perspective view of a modified form of the invention used in connection with a "McPherson" strut, a portion only of which is shown.
FIG. 19 is a view similar to FIG. 16 but showing the opening in the form of a circular opening rather than a slot.

The rod 10 of the shock absorber and the arm 14 are identical to the corresponding elements in FIG. 1 and are given the same reference characters. There is a bracket 141 which generally corresponds to the bracket 11 of FIG. 1 but is specifically different in certain respects, as will be pointed out. As with the arrangement of FIG. 1, there is a bolt 23 which extends through aligned holes in the walls 142 and 143 of bracket 141 and secures these members together against relative movement adjacent the bolt 23.

Figure 16:
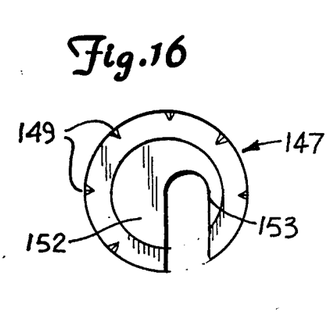
FIG. 16 is a plan view of one form of the cam used in connection with the arrangement of FIG. 15.
Figure 17:
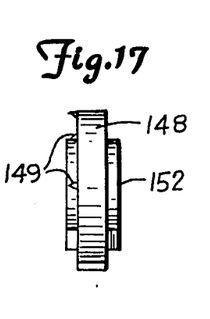
FIG. 17 is an end elevational view of the other of the two cams.

A bolt 144 extends through openings in the arm 14 and through openings in the walls 142 and 143, the opening in wall 143 being the only one shown and being indicated by the reference numeral 150. Bolt 144 is provided with the usual nut 145 and lock washer 146. Mounted on the bolt 144 and cooperating with the walls 142 and 143 of bracket 141, are two cam members 147 and 148. These cam members are provided with inwardly extending prongs 149 spaced about the periphery of the cam members and corresponding to the prongs of previously described embodiments. Secured to the cam 147 is a boss member 152 which projects both inwardly and outwardly from cam 147. The boss 152, as shown in FIGS. 15 through 17, is basically circular in character. It has a slot 153 which is in alignment with a corresponding slot in cam 147. The cam 148 has a similar boss which, as is clear from FIG. 17, extends on both sides of cam 148. The bosses 152 are designed to fit into openings 150 in the walls 142 and 143. Boss 152 is approximately the same diameter as the diameter of the opening 150. Consequently, the two cams 147 and 148 are held securely in position against any lateral movement. It is thus unnecessary to have the cam bearing members 38 and 39 of FIG. 1.

Figure 18:
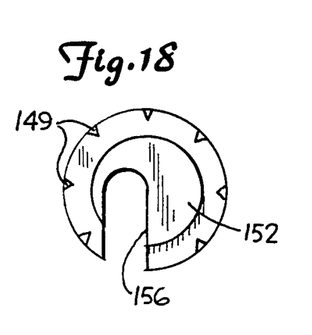
FIG. 18 is a view similar to FIG. 16 but showing the slot in the cam in a different lateral position.

The cams 147 and 148 are not intended to be turned as with the cams 31 and 32, for example. In this case, the shifting of the bolt 144 to move member 14 is accomplished by using cams with slots in different positions. For example, a comparison of FIGS. 16 and 18 will indicate that slots 153 and 156 are displaced laterally with respect to each other. Obviously, the bolt 144 will assume a different position when the cam of FIG. 18 is used than when the cam of FIG. 16 is used. In this respect, the operation is similar to that of FIGS. 10 and 11. It is understood that a large number of cams with slots in different positions will be provided and a cam having a slot corresponding to the desired correction in the alignment characteristic will be used.

The arrangement of FIGS. 15 through 19 permits the cams 147 and 148 to be placed in position without removal of the bolt 144. All that is necessary to do is to loosen the nut 145 and drop the cams 147 and 148 in place. The the nut 145 is then tightened, and the bosses of the two cams are forced into the openings 150. At the same time, because of the prongs 149, any subsequent tendency of the cams to turn will be prevented. The prongs 149, as in the previous species, will be forced into the walls 142 and 143 to hold the cams against any rotation.

Figure 20:
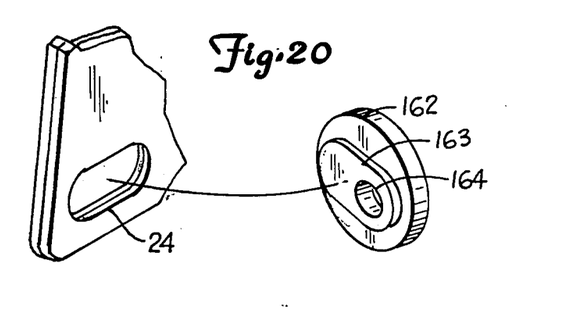
FIG. 20 is a further modification in which the boss on the cam is elongated to conform with an elongated opening in one of the elements.

MODIFICATION OF FIG. 20

The modification of FIG. 20 is somewhat similar to that of FIGS. 15 through 19, except that the boss, designated by the numeral 163, is elongated so as to conform generally in cross sectional configuration with the cross sectional configuration of the slot 24 corresponding to slot 24 of FIG. 1. There is an opening 164 through the cam, and this opening will assume various positions depending upon the amount of camber desired.

With this arrangement, it is normally unnecessary to provide inwardly facing prongs because the non-circular configuration of the boss 163 and the opening 24 into which it fits would prevent rotation of the cam after the cam has been tightened into position. The arrangement of FIG. 20 provides a very secure arrangement for maintaining a given alignment.

It should be understood that the outer periphery of the cam illustrated in FIGS. 15-20 does not necessarily have to be circular and could be rectangular, square or any other shape that may prove to be suitable.

CONCLUSION

It will be seen that I have provided an arrangement for preventing the displacement of cams used for adjusting alignment characteristics. The adjustment is maintained securely regardless of what impacts the vehicle may be subjected to.

While I have shown certain specific embodiments of the invention for purposes of illustration, it is to be understood that the invention is limited solely by the scope of the appended claims.

What is claimed is:

1. Means for adjusting at least one alignment characteristic in a suspension system for an automotive vehicle in which there is a first member secured to a wheel axle of a vehicle and a second member secured to a frame of a vehicle;

said adjusting means including a first element rigidly secured to and projecting from one of said members and a second element secured to the other of said members;

means for coupling said elements together including a bolt extending through openings in both of said elements;

a cam disposed on the bolt and engaging a relatively smooth face of one of the elements, means for guiding said cam for bolt shifting motion with respect to one of said elements while restraining it from lateral movement with respect to such element so that manipulation of the cam will cause the bolt to move laterally with respect to the element to change the relationship of the elements and hence the angular relationship of the first and second members; and means secured to the bolt for tightening the cam against the relatively smooth faces of one of the elements, the cam having a plurality of inwardly facing, spaced prongs which upon tightening of the cam against the smooth surface engaged by it will penetrate such smooth surface to prevent subsequent shifting of the cam.

2. The means of claim 1 in which the bracket element has spaced flanges which straddle the end of the arm element, each flange of the bracket element having a slot aligned with the aperture in the arm element and with the bolt extending through the slots in the flanges of the bracket element and the aperture in the arm element.

3. The means of claim 2 in which the arm element has two spaced apertures and in which each flange of the bracket element has in addition to the slot an aperture, the apertures being aligned with one of the apertures in the arm element and the slots being aligned with the other aperture in the arm element, and in which there is a second bolt which passes through the aligned apertures in the flanges of the bracket element and in the arm element.

4. The adjusting means of claim 1 in which the cam is non-rotatably secured to the bolt and is rotated by rotation of the bolt to move the cam surfaces of the cam with respect to the cam bearing surfaces.

5. The adjusting means of claim 1 in which the cam is rotatably mounted on the bolt and has tool engaging portions designed to be engaged to rotate the cam.

6. The adjusting means of claim 1 in which each cam has an open ended slot which can be placed over the bolt.

7. The adjusting means of claim 1 in which there are a plurality of sets of cams, each with an opening which can be placed over the bolt, each set of cams having openings which are displaced from the corresponding openings in a different set of cams.

8. The adjusting means of claim 7 in which the openings are slots which can be slid over the bolt.

9. The adjusting means of claim 1 in which the bolt has a flat portion and the cam has an opening therethrough of the same cross-sectional configuration as the flat portion of the bolt so that the same cannot turn on the bolt.

10. The adjusting means of claim 1 in which the prongs are disposed adjacent the periphery of the cam.

11. The adjusting means of claim 10 in which each prong is widest at its base and tapers to a point along the periphery of the cam.

12. The adjusting means of claim 1 wherein the cam is made of steel and wherein the prongs are case hardened steel.

13. Means for adjusting at least one alignment characteristic in a suspension system for an automotive vehicle in which there is a first member secured to a wheel axle of a vehicle and a second member secured to a frame of a vehicle;

said adjusting means including a first element rigidly secured to and projecting from one of said members and a second element secured to the other of said members;

means for coupling said elements together including a bolt extending through openings in both of said elements;

a cam having an opening through which the bolt extends, said cam engaging a relatively smooth face of one of the elements, means for holding said cam against lateral movement with respect to one of said elements so that the position of the bolt is dependent upon the lateral position of the opening, said cam being one of a plurality of cams in each of which the opening is spaced laterally by a different amount so that the cam that is selected determines the amount of movement of the bolt and hence the change in the relationship of the elements and thus the angular relationship of the first and second members; and means secured to the bolt for tightening the cam against the element engaged by the cam.

14. The adjusting means of claim 13 in which the cam is tightened against a relatively smooth surface of the element engaged by the cam and in which the cam has a plurality of inwardly facing, spaced prongs which upon tightening of the cam against the smooth surface engaged by it will penetrate said smooth surface to prevent subsequent shifting of the cam.

15. The adjusting means of claim 13 in which there are a plurality of opposed cams engaging opposite relatively smooth faces of the one element.

16. The adjusting means of claim 13 in which the means for holding the cam against lateral movement is a boss projecting inwardly from the cam into an opening of the same configuration as the cross sectional configuration of the boss.

17. The adjusting means of claim 13 in which the opening in each of the cams is an opening of substantially the same configuration as the cross sectional configuration of the bolt.

18. The adjusting means of claim 13 in which the opening in each of the cams is an open ended slot of substantially the same width as the diameter of the bolt.

19. Means for adjusting at least one alignment characteristic in a suspension system for an automotive vehicle in which there is a first member secured to a wheel axle of a vehicle and a second member secured to a frame of a vehicle;

said adjusting means including a first element rigidly secured to and projecting from one of said members and a second element secured to the other of said members;

means for coupling said elements together including a bolt extending through openings in both of said elements;

a cam having an opening through which the bolt extends, said cam engaging one of the elements, means for holding said cam against lateral movement with respect to one of said elements so that the position of the bolt is dependent upon the lateral position of the opening, said cam being one of a plurality of cams in each of which the opening is spaced laterally by a different amount so that the cam that is selected determines the amount of movement of the bolt and hence the change in the relationship of the elements and thus the angular relationship of the first and second members, said means for holding the cam against lateral movement being in the form of an elongated boss extending into an elongated slot of substantially the same configuration as the cross sectional configuration of the boss so as to prevent turning of the cam; and means secured to the bolt for tightening the cam against the element engaged by the cam.

* * * * *